United States Patent
Glatz

[15] 3,675,953
[45] July 11, 1972

[54] BALL JOINT

[72] Inventor: Albert Glatz, Teuchelwiesstrasse 13, Frauenfeld, Switzerland

[22] Filed: Oct. 5, 1970

[21] Appl. No.: 78,034

[30] Foreign Application Priority Data

Oct. 6, 1969 Switzerland.........................15027/69

[52] U.S. Cl................................................287/12, 287/87
[51] Int. Cl. .......................................................F16c 11/06
[58] Field of Search.........................................287/12, 21, 87

[56] References Cited

UNITED STATES PATENTS

| | | | |
|---|---|---|---|
| 2,736,580 | 2/1956 | Boetcker | 287/12 |
| 3,240,516 | 3/1966 | Barish et al. | 287/12 |
| 2,670,228 | 2/1954 | Pagliuso | 287/87 |
| 654,051 | 7/1900 | Brown et al. | 287/12 |

FOREIGN PATENTS OR APPLICATIONS

| | | | |
|---|---|---|---|
| 449,488 | 6/1936 | Great Britain | 287/21 |
| 440,670 | 1/1936 | Great Britain | 287/12 |

*Primary Examiner*—Andrew V. Kundrat
*Attorney*—Michael S. Striker

[57] ABSTRACT

A ball member is turnably accommodated in a socket and a pressure-exerting element is threaded into the socket and can be turned in a sense advancing its leading end towards the surface of the ball member. A deformable insert member is located between the ball member and the leading end of the pressure-exerting member and the surface area of contact between it and the leading end of the pressure-exerting member is smaller than the surface area of contact between it and the ball member whereby forces exerted upon the pressure-transmitting member by the pressure-exerting member are amplified when they are transmitted to the ball member.

10 Claims, 1 Drawing Figure

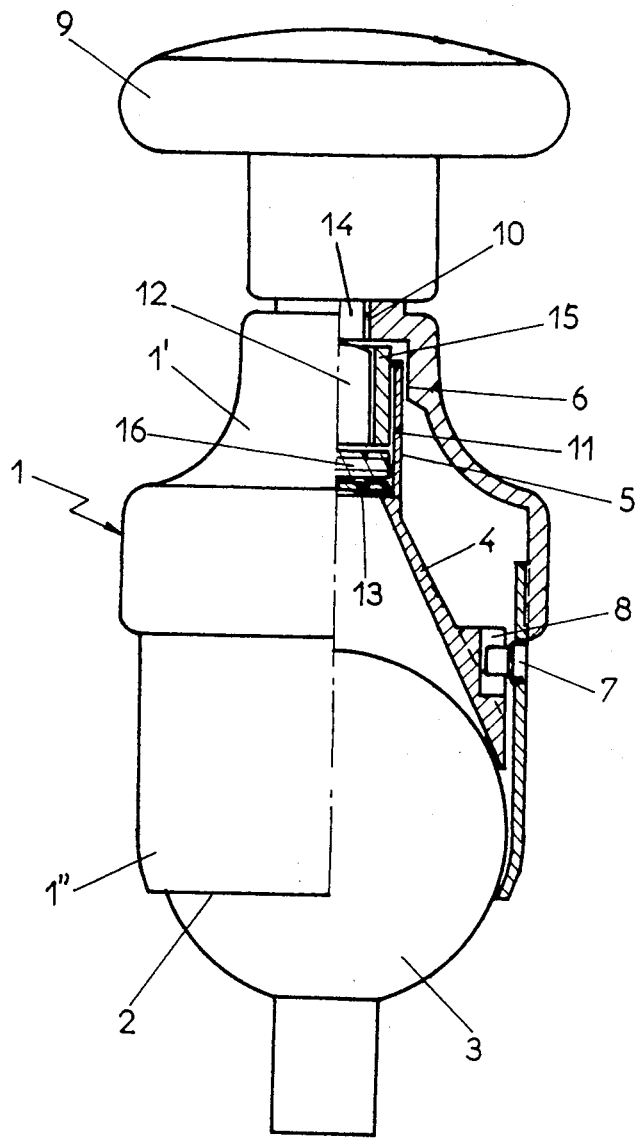

3,675,953

BALL JOINT

BACKGROUND OF THE INVENTION

The present invention relates generally to ball joints, and more particularly to ball joints which can be selectively arrested against movement.

It is frequently necessary to arrest a ball joint against movement in order to maintain it in a selected position. This of course has long been recognized in the art and there are many constructions of ball joints available which can be so arrested. One approach to the problem is to use clamping screws or setting screws which are threaded into the socket of the joint and whose leading end engages the surface of the ball member. The pressure exerted upon the ball member with such screws is, however, too small in order to prevent the ball member from turning if substantial forces act upon it in a sense tending to turn it; alternately, the force required for effecting the blocking is so great that it cannot be provided in a convenient manner, that is by providing the setting screw with a handwheel of reasonable size. Of course it is conceivable to make the handwheel very large in such cases, but space requirements very rarely permit such an approach.

An attempt to avoid these difficulties is found in the type of ball joint which is blocked by means of oil-hydraulic clamping devices. These can be constructed in various different ways, for instance in form of pressure cylinders of different diameters which amplify the pressure force exerted and transmitted to the ball member. They also, however, have a disadvantage, namely the fact that they are difficult to seal against escape of oil and therefore are rather expensive to construct. If despite the expensive sealing necessary even very small quantities of oil manage to leak, the blocking force exerted is reduced and it is therefore not possible to reliably expect freedom of such constructions from malfunction, which in turn of course adversely affects their safety of operation.

SUMMARY OF THE INVENTION

It is, accordingly, an object of the present invention to overcome the aforementioned disadvantages.

More particularly, it is an object of the invention to provide a ball joint construction wherein the ball member can be blocked as required, and which is not possessed of the aforementioned disadvantages.

A concomitant object of the invention is to provide such a ball joint construction which is very simple and therefore inexpensive, but which for this reason is also resistant to malfunction and highly reliable in its operation.

In pursuance of the above objects, and others which will become apparent hereafter, one feature of the invention resides in a ball joint which, briefly stated, comprises a socket and a ball member turnably accommodated in the socket. First means is operable for exerting a blocking force so as to prevent turning of the ball member when desired, and second means cooperates with the first means and with the ball member and is operative for amplifying the force exerted by the former and for transmitting it in amplified condition to the latter.

The second means comprises, according to the present invention, an elastically or plastically deformable member which is so arranged that the area of contact between one of its sides and the force-exerting first means is smaller than the area of contact between its other side and the ball member, it being understood that the contact in either case may be direct or indirect.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing.

BRIEF DESCRIPTION OF THE DRAWING

The single FIGURE is a somewhat diagrammatic partially longitudinally sectioned view showing one embodiment of the invention.

DESCRIPTION OF THE PREFERRED EMBODIMENTS

Discussing now the drawing in detail, it will be seen that the joint in toto is identified with reference numeral 1. It has a housing of socket composed of the upper section 1' and the lower section 1'' which extends into the upper section 1'. The lower section 1'' has an edge portion 2 remote from the upper section 1' which is deformed inwardly of the hollow lower section 1'', as particularly clearly shown in the sectioned part of the FIGURE, in order to prevent the ball member 3 which is accommodated in the lower section 1'' from falling out through the open end of the lower section 1''.

Accommodated in the interior of the housing is a substantially funnel-shaped cup 4 having a cylindrical end portion 5 remote from the ball member 3, this portion 5 being guided in a cylindrical bore or aperture 6 of the upper section 1'. As the drawing clearly shows, the ball member 3 is partially accommodated in the open end of the funnel-shaped cup 4.

Pins, screws, bolts or the like are identified with reference numeral 7 and are provided in the lower section 1'' of the housing, projecting inwardly therein and engaging in grooves 8 extending axially of the cup 4, in order to prevent the latter from turning movement within the housing.

A threaded stem 14 is in mesh with the internal threads of tapped bore 10 provided in the upper section 1'; it is fast with—in non-illustrated self-evident manner—a handgrip, handwheel, or the like identified with reference numeral 9. Thus, the turning of the handwheel 9 effects turning of the threaded stem 14 in a sense either moving the same deeper into or withdrawing it from the tapped bore 10, depending upon the direction in which the handgrip 9 is rotated. Of course, when it has been said before that the manner in which the handgrip or handwheel 9 is fast with the stem 14 is self-evident, then it will be appreciated that any suitable means may be provided for this purpose, all such means being well known in the art and including, for instance, the possibility that the stem 14 may be of one piece with the handwheel 9.

In any case, it will be appreciated that if the leading end of the stem 14 were to bear directly upon the cup 4 which in turn then would be forced into frictional engagement with the surface of the ball member 3, the pressure to be obtained in this manner would be too small to guarantee a blocking of the ball member against movement relative to the socket if any substantial forces were to act upon the ball joint in a sense tending to effect relative displacement of the ball member and socket. The alternative, to make the handwheel 9 substantially larger in order to obtain the necessary force but with the exertion of only normal strength, is usually out of the question because of lack of available space and for various other reasons, including the fact that the handwheel 9 would then have to be disproportionally larger with respect to the remainder of the joint.

The invention solves this problem by amplifying the force exerted by the handwheel 9 via the threaded stem 14, before it is transmitted to the ball member 3. Accordingly, this invention provides a bore 11 in the cylindrical portion 5 of the cup 4, with the bore having a substantially larger diameter than a pin 12 which is accommodated in the bore. The end of the bore 11 which is directed towards the ball member 3 is closed by a plate portion 13. The pin 12 is shorter than the bore 11 and guided therein by a ring 15. Located between the pin 12 and the plate 13 is an intermediate member 16 which is elastically or plastically deformable and which may consist for instance of natural or synthetic rubber, or a synthetic plastic material, as ethylene vinyl acetates, polyvinyl chlorides or the like. It is this member 16 which acts as a force amplifier.

When the handwheel 9 is turned in a sense causing the threaded stem 14 to exert pressure upon the pin 12 which in turn exerts pressure with its leading end upon the member 16, then the pressure exerted is transmitted into tn member 16 only over a surface area corresponding to the area of contact between the member 16 and the leading end of the pin 12. Because of its deformability characteristics, the member 16 tends to transmit this pressure in all directions but is prevented from doing so—that is from yielding—in those areas where it is bounded by various wall surfaces, that is upwardly by the guide ring 15 and latterly by the wall of the bore 11. Therefore, the entire force exerted upon the member 16 by the pin 12 is transmitted to the plate 13 and is thus amplified, in that the force acting upon the plate 13 is larger than the force which is transmitted to the member 16 from the pin 12 by the same factor by which the surface area of contact between the member 16 and the plate portion 13 is greater than the surface area of contact between the member 16 and the leading end of the pin 12. In other words, the amplification corresponds to the square of the difference of the two interfaces between the member 16 and the plate portion 13 on the one hand, and the member 16 and the leading end of the pin 12 on the other hand. This evidently makes it possible to exert with the relatively small handwheel 9 an adequate force which serves for blocking the ball member 3 even if substantial forces act upon the latter in a sense tending to displace it with reference to the housing.

It is an important advantage of the construction according to the present invention that the force amplification ratio can be very readily and very simply modified by replacing the ring 15 and the pin 12, it being understood that the amplification ratio decreases as the surface area of the leading endface of the pin 12 increases, and vice versa.

Naturally the illustrated embodiment is only exemplary and various possible modifications will readily offer themselves to those skilled in the art and are of course intended to be included within the scope and concept of the invention. It is thus possible, for instance, to omit the plate portion 13 and instead have it replaced with a corresponding wall portion which is of one piece with the cup 4. In this case, the pressure exerted by the member 16 acts directly upon the cup 4 instead of via the intermediary of the plate portion 13. Another possibility modification is to omit the plate portion 13 and to have the member 16 contact the outer surface of the ball member 3 directly. If that is the case, it is advantageous but not necessary that the surface of the member 16 which contacts the surface of the ball member 3 be conformed at least substantially to the contour of the surface of the ball member 3, namely that it be of arcuately concave configuration—i.e., calotte-shaped or hemispherically-shaped—having a radius of curvature which corresponds to or at least resembles that of the ball member 3.

Naturally, various different materials are suitable for the various components and all such materials are intended to be included within the concept and scope of the present invention.

It will be understood that each of the elements described above, or to or more together, may also find a useful application in other types of constructions differing from the types described above.

While the invention has been illustrated and described as embodied in a ball joint, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be protected by Letters Patent is set forth in the appended claims:

1. A ball joint, comprising a socket having an outer cup portion provided with an open end, and an inner cup portion open toward said open end, said inner cup portion being located within said outer cup portion with limited freedom of axial movement toward and away from said open end; a ball member turnably accommodated in said open end and partly located within said inner cup portion in at least line-contact therewith; first means operable for exerting a thrust force toward said ball member so as to prevent turning of said ball member when desired; second means cooperating with said first means and said ball member and operative for amplifying the force exerted by the former and transmitting it in amplified condition to the latter via axial movement of said inner cup portion; and detent means cooperating with said inner and outer cup portions for preventing relative rotational movements of the same.

2. A ball joint as defined in claim 1, said first means having a force-transmitting first surface of a first surface area acting upon said second means, and said second means having a force-transmitting second surface acting upon said ball member and having a larger second surface area.

3. A ball joint as defined in claim 2, said second means comprising an element of deformable material; and said inner cup portion comprising wall means surrounding said element and preventing deformation of the same in a sense other than transmitting force to said ball member.

4. A ball joint as defined in claim 3, said wall means comprising an annular member surrounding said element, and a chamber-defining wall surrounding and guiding said annular member.

5. A ball joint as defined in claim 3; further comprising an intermediate pressure-transmitting member interposed between said element and said ball member and transmitting pressure from the former to the latter.

6. A ball joint as defined in claim 2, said first means comprising force-exerting means, and transmitting means between the same and said second means for transmitting force to the latter.

7. A ball joint as defined in claim 1, said second means transmitting force to said inner cup portion in a sense effecting pressure engagement of the latter with said ball member so as to transmit said force indirectly to the latter.

8. A ball joint as defined in claim 7; and further comprising a plate member interposed between said second means and said inner cup portion and transmitting said force from the former to said inner cup portion.

9. A ball joint as defined in claim 7, said inner cup portion having a closed side provided with a tubular extension open in direction oppositely away from said open end, and said second means being located in said extension with said first means extending into the same and contacting said second means.

10. A ball joint as defined in claim 2, said inner cup portion having a contact surface contacting said ball member and being arcuately concave on a radius which at least approximates the radius of curvature of said ball member.

* * * * *